R. R. HUGHES.
WHEEL.
APPLICATION FILED OCT. 27, 1915.
1,248,124.
Patented Nov. 27, 1917.
2 SHEETS—SHEET 1.
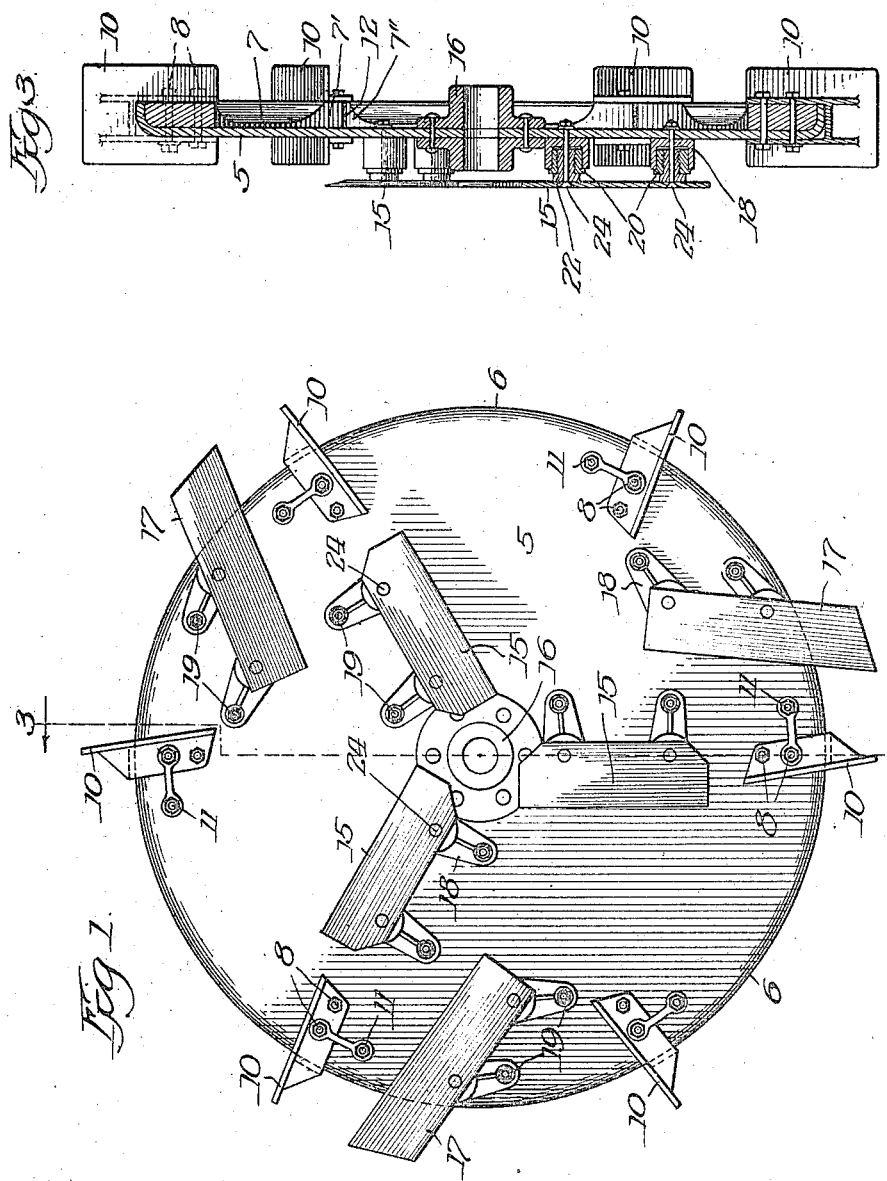

R. R. HUGHES.
WHEEL.
APPLICATION FILED OCT. 27, 1915.
1,248,124.
Patented Nov. 27, 1917.
2 SHEETS—SHEET 2.
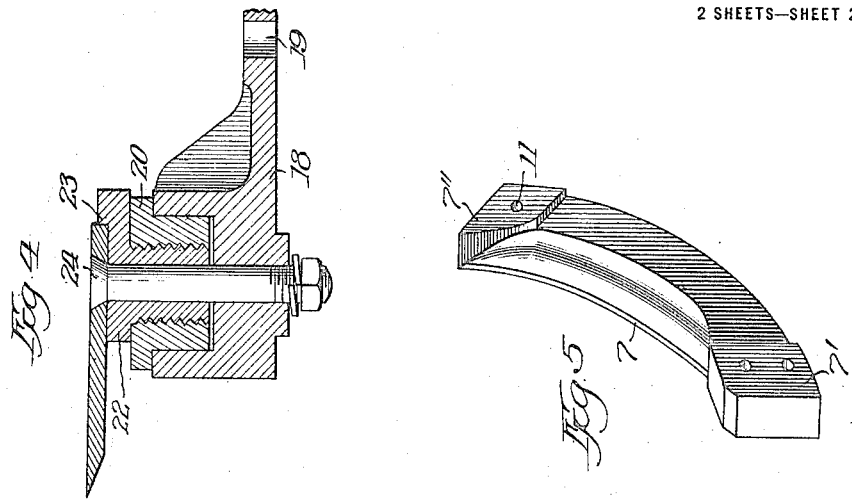
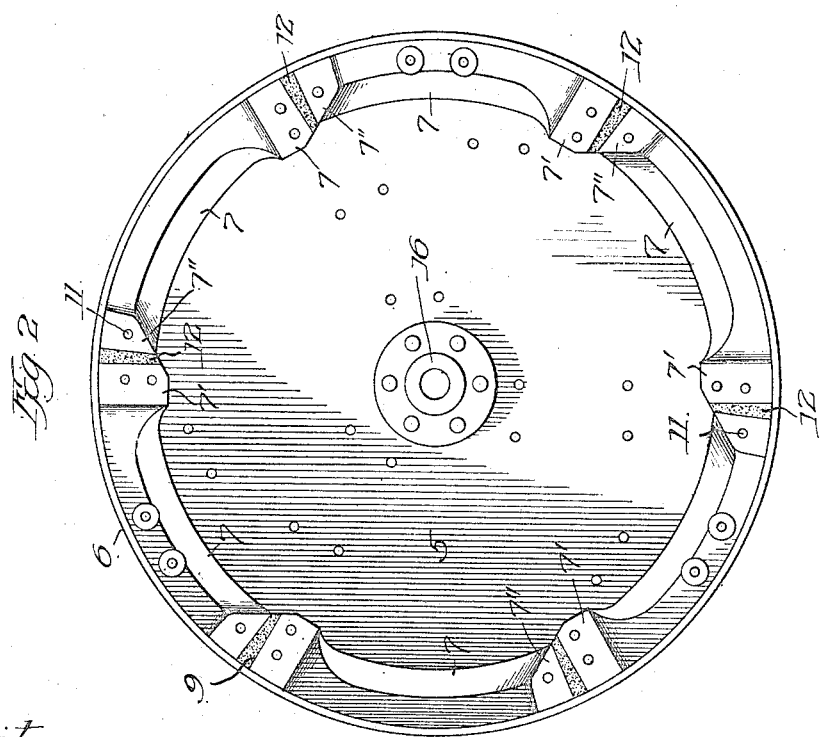
Witnesses:
Inventor
Richard R. Hughes,
By James A. Walsh,
Atty.

UNITED STATES PATENT OFFICE.

RICHARD R. HUGHES, OF RACINE, WISCONSIN, ASSIGNOR TO BELLE CITY MANUFACTURING COMPANY, OF RACINE, WISCONSIN, A CORPORATION.

WHEEL.

1,248,124.   Specification of Letters Patent.   Patented Nov. 27, 1917.

Application filed October 27, 1915. Serial No. 58,267.

*To all whom it may concern:*

Be it known that I, RICHARD R. HUGHES, a citizen of the United States, residing at Racine, in the county of Racine and State of Wisconsin, have invented certain new and useful Improvements in Wheels, of which the following is a specification.

The object of my invention is to provide a wheel for various purposes which may be utilized in connection with other elements requiring power from a rotary wheel for performing work in different arts, which improvement insures that such wheel may be constructed of comparatively light material, indestructible under ordinary usage, readily balanced to run true, and which is capable of performing unusually heavy work without danger of bursting under centrifugal force or becoming broken by articles placed in accidental contact therewith while rotating.

In the accompanying drawings, forming a part hereof, for purposes of illustration I have shown my improved wheel equipped with devices adapted for use in cutting and storing fodder, in which drawings Figure 1 is an elevation of the face of said wheel with such devices applied thereto; Fig. 2, an elevation of the opposite side of said wheel; Fig. 3, a transverse sectional view on the dotted line 3—3 in Fig. 1; Fig. 4, a detail sectional view of means for securing such cutting devices to said wheel; and Fig. 5 is a detail showing one of the sectional balancing fillers which I employ.

In said drawings, the portions marked 5 indicate my improved wheel, which is made from a single piece of sheet metal in cup-shaped formation and is practically solid, including a preferably integral flange, 6, projecting at one side of its periphery, the formation being similar to an ordinary boiler head. Upon the flanged side of said wheel and adapted to snugly fit under said flange 6 I provide a plurality of fillers, 7, preferably segmental in form and having enlarged ends or shoulders, 7' and 7", said fillers being so formed and proportioned as to be adaptable for different sizes of wheels, and thus interchangeable for such application or for renewal and repair. Said fillers 7 are attached to wheel 5 preferably by bolts, 8, and when said wheel is employed for the purpose illustrated the meeting ends of these fillers may be spaced, as at 9, for the reception of such devices as the blades, 10, which may be secured by said bolts 8 and also by bolts, 11, or otherwise. The fillers 7 form weights for balancing the wheel 5, and being held securely under flange 6, are prevented thereby from dislodgment by the centrifugal action of the wheel. In order to insure that wheels of this character shall be perfectly balanced to a nicety, should one or more of the fillers 7 vary in weight or for other reason the wheel is not absolutely balanced, the space 9 left between the ends of said fillers is preferably wedge-shaped in form, so that a lead or other filling, as 12, of a required amount may be introduced therein and the correct balance of the wheel may thus be determined.

When such wheel is equipped for cutting, knives of any ordinary or desired construction may be affixed thereto and arranged in any suitable manner, or as indicated; that is, a group, 15, may be immediately disposed about the hub, 16, of the wheel, and an outer set of knives may be arranged adjacent the wheel periphery. Each of said knives may be adjustably mounted in any desired manner, the device shown including the bracket, 18, secured to wheel 5 by bolts, 19, in which bracket is mounted an internally-threaded shouldered nut, 20, and in which nut may be held a threaded stud, as 22, the head thereof being cut away from the portion 23 to provide a knife-seat, the knife being preferably held in position by a countersunk bolt, 24, extending through the parts mentioned and the wheel 5 and secured thereto as desired. As indicated, such wheel may be employed for different purposes, and because of its solid and tough character it is capable of receiving and sustaining instrumentalities applicable to a wheel for power purposes.

By constructing the wheel in the manner described, and preferably from tough sheet metal such as boiler iron, the liability of breakage is obviated, and by retaining the fillers within the flange thereof I produce in effect the equivalent of a spoked wheel having a heavy rim surrounded by a steel band, which latter has been found in practice to be necessary to prevent such spoked wheel from flying in pieces and causing injury to attendants and damage to property, but which such arrangement is not always reliable, and by my improved construction I provide an imperforate wheel which cannot be broken by the accidental insertion of articles such as tools and the like, which is a common occurrence where spoked wheels are employed, and which improved wheel may be readily and evenly balanced to run true by the attachment of the fillers as hereinbefore described.

I claim as my invention:

1. A wheel provided with a peripheral flange and a plurality of members arranged within said flange and providing substantially a continuous weighting and balancing means therefor.

2. A wheel provided with a peripheral flange, weighting means secured to the wheel within said flange and additional balancing means therefor.

3. A wheel provided with a peripheral flange and a plurality of fillers secured thereto within said flange, the ends of said fillers being arranged in spaced relation to provide receptacles and balancing means introduced therein.

4. A wheel provided with a peripheral flange and segmental fillers secured thereto within said flange and having their ends enlarged and weighted.

5. A wheel provided with a peripheral flange and a plurality of segmental fillers concentrically arranged within said flange and secured to said wheel.

6. A wheel provided with a peripheral flange and a plurality of segmental fillers concentrically arranged within said flange and secured to said wheel, the ends of said fillers being enlarged and arranged in spaced relation to one another to provide receptacles and balancing means introduced therein.

7. A wheel embodying a peripheral flange projecting from one side only thereof said wheel being substantially cup-shaped in formation, a plurality of fillers disposed about and adjacent the periphery of said wheel and beneath said flange and spaced apart from each other for the insertion of balancing material therebetween, and means for securing said fillers to said wheel.

In testimony whereof I affix my signature in presence of two witnesses.

RICHARD R. HUGHES.

Witnesses:
ROBERT ALLEN,
FRANK THOMAS.

Copies of this patent may be obtained for five cents each, by addressing the "Commissioner of Patents, Washington, D. C."